(12) United States Patent
Purgason (10) Patent No.: US 10,223,258 B2
(45) Date of Patent: Mar. 5, 2019

(54) AUTOMATED VIRTUAL MACHINE PERFORMANCE TUNING

(71) Applicant: Microsoft Technology Licensing, LLC, Redmond, WA (US)

(72) Inventor: Benjamin David Purgason, Morgan Hill, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/464,634

(22) Filed: Mar. 21, 2017

(65) Prior Publication Data

US 2018/0276117 A1 Sep. 27, 2018

(51) Int. Cl.
*G06F 9/455* (2018.01)
*G06F 12/02* (2006.01)

(52) U.S. Cl.
CPC ...... *G06F 12/0253* (2013.01); *G06F 9/45558* (2013.01); *G06F 2009/45583* (2013.01); *G06F 2009/45591* (2013.01); *G06F 2212/1044* (2013.01); *G06F 2212/152* (2013.01)

(58) Field of Classification Search
None
See application file for complete search history.

*Primary Examiner* — Gregory A Kessler
(74) *Attorney, Agent, or Firm* — Schwegman Lundberg & Woessner, P.A.

(57) ABSTRACT

Disclosed are systems, methods, and non-transitory computer-readable media for automated. VM performance tuning. An auto-tuning system implements a three stage automated VM performance tuning process to optimize garbage collection. In the first stage, the auto-tuning system analyzes garbage collection logs to calculate garbage collection parameters to configure the new generation portion of the memory heap (e.g., maximum tenuring age, maximum new size and survivor ratio). In the second stage, the auto-tuning system implements the calculated garbage collection parameter and monitors garbage collection activity for the VM to determine the resulting effects. In the third stage, the auto-tuning system tunes the old generation portion of the memory heap based on the monitored garbage collection activity. Specifically, the auto-tuning system determines a promotion rate from the monitored garbage collection activity and then determines a total memory heap size based on the promotion rate to achieve a target major garbage collection rate.

20 Claims, 5 Drawing Sheets

AUTOMATED VIRTUAL MACHINE PERFORMANCE TUNING

TECHNICAL FIELD

An embodiment of the present subject matter relates generally to virtual machines and, more specifically, to automated virtual machine performance tuning.

BACKGROUND

In Virtual Machines (VMs) (e.g., Java Virtual Machines) automatic garbage collection is the process of looking at heap memory to automatically reclaim memory for reuse. The heap memory is scanned and pieces of memory that are in use are marked. The remaining unused memory is reclaimed. Garbage collection allows developers to create new objects without worrying explicitly about memory allocation and deallocation.

Performing garbage collection causes operation of application threads to stop until the garbage collection is completed. As more objects are allocated to the memory heap, the time to perform garbage collection increases. Most data objects are short lived so focusing garbage collection on these data objects can reduce latency. The memory heap is divided into a new generation and an old generation. Data objects are initially allocated to the new generation and eventually moved to the old generation if they survive for a threshold period of time. Garbage collection can be performed on the new generation to target short lived data objects without scanning the entirety of the memory heap.

Administrators can adjust configuration settings in attempts to modify performance of the garbage collection to their specific needs. Existing solutions, however, largely exist in the form of various "diagnostic suites" that only provide general guidance to remove problems. Accordingly, existing solutions do not have the capability to implement specified behaviors, implement configurations, or directly improve a running VM.

It is within this context that the present disclosure arises.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for automated VM performance tuning. An auto-tuning system implements a three stage automated VM performance tuning process to optimize garbage collection. In the first stage, the auto-tuning system analyzes garbage collection logs to calculate garbage collection parameters to configure the new generation portion of the memory heap (e.g., maximum tenuring age, maximum new size and survivor ratio). In the second stage, the auto-tuning system implements the calculated garbage collection parameter and monitors garbage collection activity for the VM to determine the resulting effects. In the third stage, the auto-tuning system tunes the old generation portion of the memory heap based on the monitored garbage collection activity. Specifically, the auto-tuning system determines a promotion rate from the monitored garbage collection activity and then determines a total memory heap size based on the promotion rate to achieve a target major garbage collection rate of the old generation portion of the memory heap.

Figure 1:
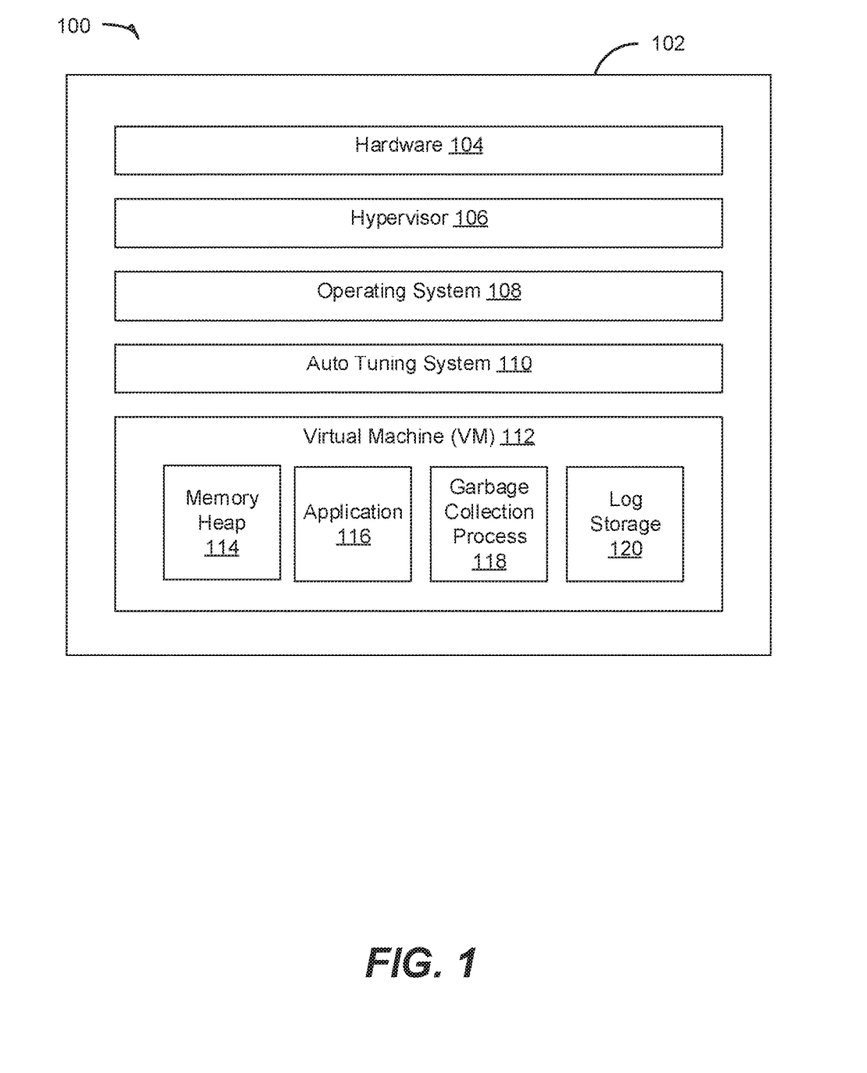
FIG. 1 is a block diagram illustrating select components of an exemplary system that can be utilized to tune garbage collection for a VM, according to certain example embodiments.

Referring now to the drawings, and in particular, to FIG. 1, a block diagram 100 illustrates select components of an exemplary system 102 that can be utilized to tune garbage collection for a VM, according to example embodiments. The exemplary system 102 includes hardware 104, a hypervisor 106, at least one operating system 108 and auto-tuning system 110. The hardware 104 includes physical components, such as a plurality of physical processors, memory and related technologies that are associated with a physical computer processing device. The hypervisor 106 is a virtualization technology that allows multiple operating systems 108 to run concurrently on the hardware 104. Each operating system 108 typically comprises software that serves as a platform to manage associated application programs that run within the corresponding operating system 108. Each operating system 108 further interfaces between the hardware 104, via the hypervisor 106, and a user of the corresponding physical processing device.

The exemplary system 102 further includes a VM 112. For purposes of discussion herein, only one VM 112 is shown, however, in practice, any number of VMs 112 may be implemented. The VM 112 may correspond to any type of virtual machine technology that utilizes a garbage collection process to clean up an associated memory heap 114 or similar memory structure. Exemplary virtual machine technologies include, but are not limited to Java, Dis, Smalltalk, etc.

By way of illustration, and not by way of limitation, the VM 112 is implemented as a process virtual machine that supports a single process. For instance, the VM 112 may comprise a Java Virtual Machine (JVM). As illustrated, a single application 116 operates within the VM 112. During execution, the application 116 allocates objects into an associated memory heap 114. From time to time, the VM 112 invokes a garbage collection process 118 to clean up the associated memory heap 114. Log storage 120 stores garbage collection logs describing garbage collection activity associated with the garbage collection process 118. Garbage collection will be described in greater detail herein. In this regard, the application 116, the memory heap 114, log storage 120 and any corresponding maintenance of the memory heap 114 uniquely associated with the application 116 garbage collection process 118, are isolated from other aspects within the system 102 by virtue of their execution within the VM 112.

As noted above, an application 116 running on the VM 112 allocates objects into an associated memory heap 114. Upon certain predetermined conditions being met, such as the memory heap 114 or a portion of the memory heap (e.g., new generation or old generation) reaching a predetermined threshold capacity, the VM 112 invokes the garbage collection process 118. The garbage collection process 118 identifies objects within the memory heap 114 that are no longer being used and frees up the memory associated with identified objects for future allocations.

By way of illustration, a typical garbage collection process generally includes two phases, including a mark phase and a sweep phase. The mark phase identifies and marks the data objects that are still in use, while the data objects in the memory heap that are not being used remain unmarked. Correspondingly, the sweep phase reclaims memory within the heap that is occupied by the objects identified during the mark phase as being unused (i.e., the unmarked data objects). Many garbage collection processes also optionally implement a compact phase that brings disjoined memory chunks storing objects that are still being used, into a contiguous portion of memory.

The system 102 further includes an auto-tuning system 118 that implements a three stage automated VM performance tuning process to optimize the garbage collection process 118. In the first stage, the auto-tuning system 110 analyzes garbage collection logs from log storage 120 and calculates garbage collection parameters to configure the new generation portion of the memory heap 114 (e.g., maximum tenuring age, maximum new size and survivor ratio). In the second stage, the auto-tuning systems 10 implements the calculated garbage collection parameters and monitors garbage collection activity for the VM 112 to determine the resulting effects. In the third stage, the auto-tuning system 110 tunes the old generation portion of the memory heap 114 based on the monitored garbage collection activity. Specifically, the auto-tuning system 110 determines a promotion rate from the monitored garbage collection activity and then determines a total memory heap size based on the promotion rate to achieve a target major garbage collection rate of the old generation portion of the memory heap 114. The functionality of the auto-tuning system 110 is described in greater detail below.

Figure 2:
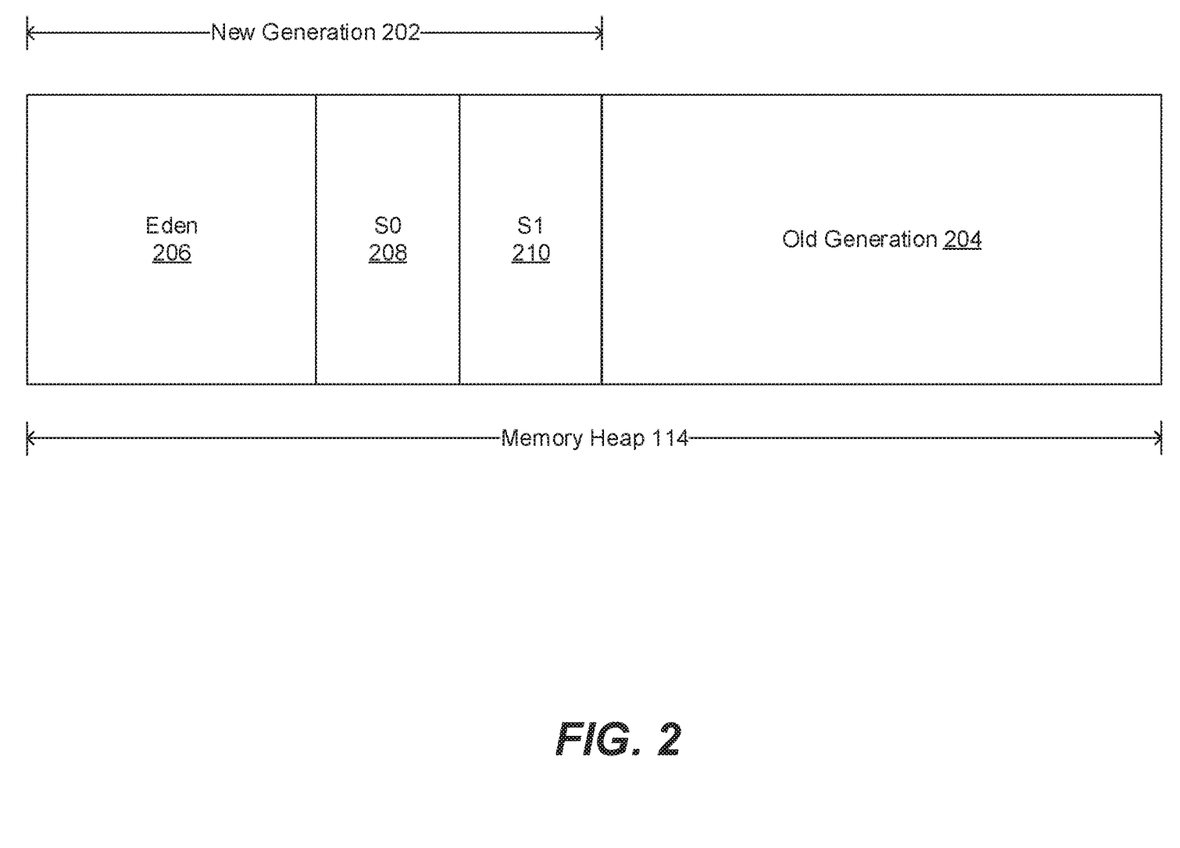
FIG. 2 is a block diagram of a memory heap, according to certain example embodiments.

FIG. 2 is a block diagram of a memory heap 114, according to example embodiments. The memory heap 114 is physically divided into two parts—new generation 202 and old generation 204. New data objects are initially allocated to the new generation 202. When the new generation 202 is filled, garbage collection is performed on the new generation 202 alone (i.e., garbage collection is not performed on the old generation 204). This is called a minor garbage collection.

As shown the new generation 202 is divided into three parts—eden memory 206 and two survivor memory spaces: S0 208 and S1 210. Newly created data objects are initially allocated to the eden memory 206. As most data objects are short lived, most of the newly created objects are located in the eden memory 206. In the event that the eden memory 206 becomes full or full beyond a threshold point with data objects, a minor garbage collection is performed and all the survivor objects (e.g., data objects that are still in use) are moved to one of the survivor spaces (e.g., S0 or S1). For example, the garbage collection process 118 scans the eden memory 206 and marks data objects that are still in use, which are then moved to one of the survivor spaces. The unused data objects are then deleted to reclaim memory space.

During a minor garbage collection, the garbage collection process 118 also checks the data objects in survivor spaces S0 208 and S1 210, and removes unused data objects. Data objects determined to still be in use are moved to the other survivor space. Accordingly, one of the survivor space is always empty.

Data objects that are survived after many cycles of minor garbage collection are moved from survivor spaces S0 208 and S1 210 to the old generation 204 portion of the memory heap 114. This is generally accomplished by setting a threshold age (i.e., maximum tenuring age) after which a data objects is promoted to the old generation 208. The tenuring age measures a number of garbage collection cycles that a data object has survived.

The old generation 204 portion of the memory heap 114 contains data objects that are long lived and that have survived many rounds of minor garbage collection. In the event that the old generation 208 becomes full or full beyond a predetermined threshold, the garbage collection process 118 performs a major garbage collection. During a major garbage collection, the old generation 204 is scanned and unused data objects are removed. A major garbage collection generally takes longer than a minor garbage collection.

Both minor and major garbage collections cause application threads to be stopped until the garbage collection operation 118 completes, Since the new generation 202 portion of the memory heap 114 maintains the short-lived data objects, performing a minor garbage collection is generally very fast and performance of the application 116 is not noticeably affected. In contrast, a major garbage collection takes longer and performance of the application may be noticeably affected (e.g, timeout errors). Accordingly, minimizing major garbage collection positively impacts the performance of the application 116.

The performance of the garbage collection process 118 varies based on garbage collection parameters that define the structure of the memory heap 114. For example, the garbage collection parameters include a maximum tenuring age, a maximum new size, a survivor ratio and a total heap size. The maximum tenuring age defines a threshold tenuring age after which data objects are promoted from the new generation 202 portion of the memory heap 114 to the old generation portion 204 of the memory heap. The maximum new size defines an amount of the memory heap 114 that is to be allocated to the new generation 202. The survivor ratio defines a size ratio between each survivor space (e.g., S0 208 and S1 210) and eden 206. The total heap size defines an amount of total memory that should be allocated to the memory heap 114.

The auto-tuning system 110 automatically modifies the garbage collection parameters to optimize performance of the VM 112. Specifically the auto-tuning system 110 implements a three stage automated VM performance tuning process to optimize the garbage collection process 118. In the first stage, the auto-tuning system 110 analyzes garbage collection logs from log storage 120 and calculates garbage collection parameters to configure the new generation 202 portion of the memory heap 114 (e.g., maximum tenuring age, maximum new size and survivor ratio). In the second stage, the auto-tuning system 110 implements the calculated garbage collection parameters and monitors garbage collection activity for the VM 112 to determine the resulting effects. In the third stage, the auto-tuning system 110 tunes the old generation 204 portion of the memory heap 114 based on the monitored garbage collection activity. Specifically, the auto-tuning system 110 determines a promotion rate of data objects from the new generation 202 to the old generation 204. The auto-tuning system 110 then determines a total memory heap size based on the promotion rate to achieve a target major garbage collection rate of the old generation 204 portion of the memory heap 114.

Figure 3:
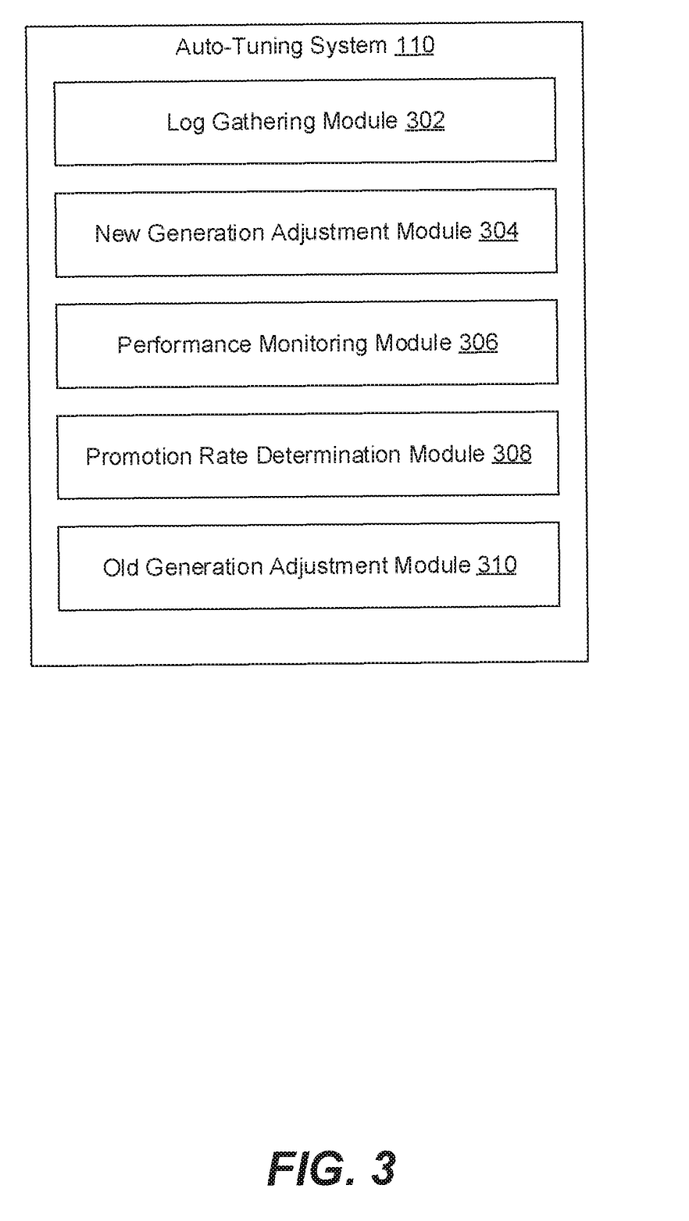
FIG. 3 is a block diagram of the auto-tuning system, according to certain example embodiments.

FIG. 3 is a block diagram of the auto-tuning system 110, according to certain example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by auto-tuning system 110 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, auto-tuning system 110 includes a log gathering module 302, a new generation adjustment module 304, a performance monitoring module 306, a promotion rate determination module 308 and an old generation adjustment module 310. The log gathering module 302 gathers garbage collection logs for a VM 112. The log gathering module 302 communicates with the VM 112 to gather the garbage collection logs from log storage 120. The garbage collection logs describe garbage collection activity for the VM 112 while the VM 112 is performing according to an initial set of garbage collection parameters (e.g., maximum tenuring age, maximum new size, survivor ratio, total heap size, etc.). Examples of data included in the garbage collection logs includes data describing data objects added to the memory heap, minor garbage collections performed, major garbage collections performed, data objects that are deleted during a garbage collection, data. objects that are promoted to the old generation, time stamps indicating when events occurred, tenuring ages of data objects, etc.

The new generation adjustment module 304 analyzes the garbage collection logs gathered by the log gathering module 302 to tune the new generation 202 portion of the memory heap 114. For instance the new generation adjustment module 206 determines an updated maximum tenuring age, an updated maximum new size and an updated survivor ratio based on the analysis of the garbage collection logs. Accordingly, the auto-tuning system 110 tunes the new generation 202 portion of the memory heap 114 based on the performance of the VM 112 (e.g., based on the data objects generated by the application 116 running on the VM 112). Updating the maximum tenuring age, an updated maximum new size and an updated survivor ratio causes the VM 112 and the garbage collection process 118 to perform according to the updated garbage collection parameters (i.e., updated maximum tenuring age, updated maximum new size and updated survivor ratio).

The new generation adjustment module 304 determines the updated maximum tenuring age by analyzing data in the garbage collection logs that describes a set of data objects at incremental tenuring ages. For instance, the new generation adjustment module 304 determines a delta in the number of data objects that survive after each sequential minor garbage collection. The delta can indicate a numerical or percentage difference in the number data objects that survive after each sequential minor garbage collection. For example, if a minor garbage collection is performed on 10 data objects and only 8 data objects survive, the new generation adjustment module 304 would determine that the delta is 2 (i.e., 10 minus 8) or 20%.

The new generation adjustment module 304 compares the delta after each minor garbage collection to a threshold delta value. The new generation adjustment module 304 assigns the tenuring age at which the delta value does not meet the threshold delta to be the updated maximum tenuring age. For example, the new generation adjustment module 304 assigns the updated maximum tenuring age to be the tenuring age at which at least 90% of the data objects survive (i.e., the number of data objects that died does not represent more than 10% of the data objects). For example, if the new generation adjustment module 304 determines that at least 90% of the data objects survived when the data objects went from a tenuring age of 3 to a tenuring age of 4, the new generation adjustment module 304 would assign the updated maximum tenuring age as 4.

The new generation adjustment module 304 determines the updated maximum new size based on an allocation rate and a target minor garbage collection rate. The allocation rate is a rate at which new data objects are allocated to the memory heap 114 by the application 116 (i.e., the rate at which data objects are allocated to eden 206). The allocation rate can be measured in megabytes (MB) per second.

The target minor garbage collection rate indicates a target number of minor garbage collections to be performed per a specified time frame. For instance, the target minor garbage collection rate can indicate a target number of minor garbage collections to be performed per minute, hour, day, etc. The target minor garbage collection rate is selected by an administrator or other user based on desired performance. The new generation adjustment module 304 divides the allocation rate by the target minor garbage collection rate to yield the updated maximum new size. Accordingly, a lower target minor garbage collection rate will result in a larger amount of memory being designated to the new generation 202 portion of the memory heap 114. Conversely, a higher target minor garbage collection rate will result in a smaller amount of memory being designate to the new generation 202 portion of the memory heap 114.

After the new generation adjustment module 304 determines the updated maximum new size, the new generation adjustment module 304 determines a subset of the new generation 202 to designate as the eden 206. The new generation adjustment module 304 determines from the remaining subset of the new generation 202 (i.e., the subset of the new generation 202 that is not designated as the eden 206) a number of survivor spaces and their corresponding sizes, yielding an updated survivor ratio.

The performance monitoring module 306 monitors performance of the VM after the new generation adjustment module 304 tunes the new generation 202 portion of the memory heap 114 (i.e., determines an updated maximum tenuring age, an updated maximum new size and an updated survivor ratio). Monitoring performance of the VM includes monitoring data objects allocated to the memory heap 114 as well as garbage collection activities (e.g., minor garbage collection and major garbage collection). The performance monitoring module 306 yields monitored performance data.

The promotion rate determining module 308 determines a promotion rate based on the monitored performance data provided by the performance monitoring module 306. The promotion rate is a rate at which data is promoted from the new generation 202 portion of the memory heap to the old generation 204 portion of the memory heap 114, The promotion rate can be measured in MB per second.

The old generation adjustment module 310 determines an updated total memory heap size based on the promotion rate and a target major garbage collection rate. The target major collection rate is selected by an administrator or other designated user and indicates a target number of major garbage collections to be performed per a specified time frame. For instance, the target major garbage collection rate can indicate a target number of major garbage collections to be performed per minute, hour, day, etc. The old generation adjustment module 304 determines an updated total memory heap size to result in the target major garbage collection rate. Adjusting the total memory heap size will affect the size of the old generation 204 portion of the memory heap 114 because the size of the new generation 202 has been set by the new generation adjustment module 304. To achieve a lower target major garbage collection rate, the old generation adjustment module 310 increases the amount of memory designated to the old generation 204 portion of the memory heap 114. Conversely, to achieve a higher target major garbage collection rate, the old generation adjustment module 310 decreases the amount of memory designated to the old generation 204 portion of the memory heap 114. Determining the updated total memory heap size causes the VM 112 and the garbage collection process 118 to perform according to a finalized set of garbage collection parameters (i.e., updated maximum tenuring age, updated maximum new size, updated survivor ratio and updated total memory heap size).

Figure 4:
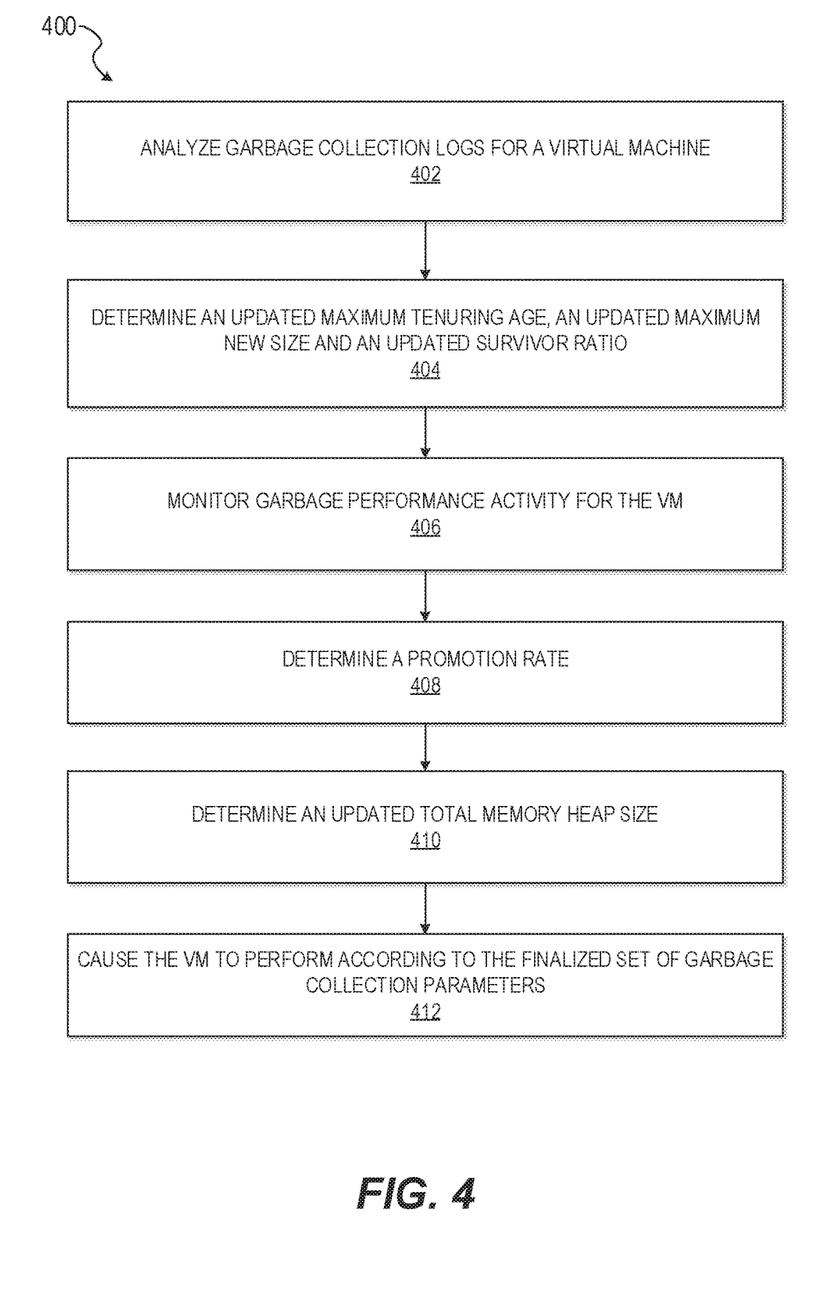
FIG. 4 is a flowchart showing an example method of automated VM performance tuning, according to certain example embodiments.

FIG. 4 is a flowchart showing an example method 400 of automated VM performance tuning, according to certain example embodiments. The method 400 may be embodied in computer readable instructions for execution by one or more processors such that the operations of the method 400 may be performed in part or in whole by the auto-tuning system 110; accordingly, the method 400 is described below by way of example with reference thereto. However, it shall be appreciated that at least some of the operations of the method 400 may be deployed on various other hardware configurations and the method 400 is not intended to be limited to the auto-tuning system 110.

At operation 402, the new generation adjustment module 302 analyzes garbage collection logs for a VM 112. The garbage collection logs describe garbage collection activity for the VM 112 having been performed according to an initial set of garbage collection parameters. The garbage collection parameters include an initial maximum tenuring age, an initial maximum new size, an initial survivor ratio, and an initial total heap size.

At operation 404, the new generation adjustment module 302 determines an updated maximum tenuring age, an updated maximum new size and an updated survivor ratio. The new generation adjustment module determines the updated garbage collection parameters (i.e., updated maximum tenuring age, updated maximum new size and updated survivor ratio) based on the analysis of the garbage collection logs.

To determine the updated maximum tenuring age, the new generation adjustment module 302 determines, based on data describing a set of data objects created by the VM 112, a number of data objects from the set of data objects that were alive at a first tenuring age and a number of data objects from the set of data objects that were alive at a second tenuring age that is subsequent to the first tenuring age. The first tenuring age and the second tenuring age indicate a number of respective times the set of data objects have been copied to survivor spaces in the new generation 202 portion of the memory heap 114 as the result of a minor garbage collection.

The new generation adjustment module 302 then determines a delta between the number of data objects from the set of data objects that were alive at the first tenuring age and the number of data objects from the set of data objects that were alive at the second tenuring age and compares the delta to a threshold value. The threshold value can be based on a percentage of the data objects that were alive at the first tenuring age, such as 10%. Accordingly, if 20 data objects were alive at the first tenuring age, the threshold value would be 2 (i.e., 10% of 20).

In response to determining that the delta is less than the threshold value, the new generation adjustment module 302 assigns the second tenuring age as the updated maximum tenuring age. The maximum tenuring age indicates a threshold number of times that a data object can be copied to survivor spaces in the new generation 202 portion of the memory heap 114 prior to being moved to the old generation 204 portion of the memory heap 114.

To determine the updated maximum new size, the new generation adjustment module 302 determines an allocation rate of data to the memory heap. The new generation adjustment module 302 then divides the allocation rate by a target minor garbage collection rate, yielding the updated maximum new size. The target minor garbage collection rate indicates a target frequency at which garbage collection is performed on the new generation 202 portion of the memory heap 214. For example, the target minor garbage collection rate indicated a desired number of desired number of minor garbage collections to occur within a specified period of time, such as number of minor garbage collections per day. The target minor garbage collection rate is selected by an administrator of other designated user.

To determine the updated survivor ratio, the new generation adjustment module 302 determines a subset of the new generation 202 portion of the memory heap 114 to designate as eden 206. The new generation adjustment module 302 then determines, from a remaining subset of the new generation 202 portion of the memory heap 114 that is not designated as eden 206, two or more survivor spaces.

At operation 406, the performance monitoring module 306 monitors garbage performance activity for the VM 112 while the VM 112 (e.g., the garbage collection process 118) is performing according to updated garbage collection parameters (i.e., updated maximum tenuring age, updated maximum new size and updated survivor ratio). Monitoring the garbage performance activity yields monitored performance data. For example, the performance monitoring module 306 can gather data describing performance of the VM 112 and/or monitor garbage collection logs generated during performance according to the updated garbage collection parameters.

At operation 408, the promotion rate determination module 308 determines a promotion rate based on the monitored performance data. The promotion rate indicates the rate at which data is promoted from the new generation 202 portion of a memory heap 114 associated with the VM 112 to an old generation 204 portion of the memory heap 114.

At operation 410, the old generation adjustment module 310 determines an updated total memory heap size based on the promotion rate and a target major garbage collection rate.

At operation 412 the old generation adjustment module 310 causes garbage collection for the VM 112 to be performed according to the finalized set of garbage collection parameters (i.e., updated maximum tenuring age, updated maximum new size, updated survivor ratio and updated total memory heap size). For example, when the updated total memory heap size is greater than the initial total memory heap size, the old generation adjustment module 310 causes additional memory to be allocated to the memory heap 114 based on the updated total data heap size. Allocating the additional memory causes a memory size increase to the old generation 204 portion of the memory heap 114.

Figure 5:
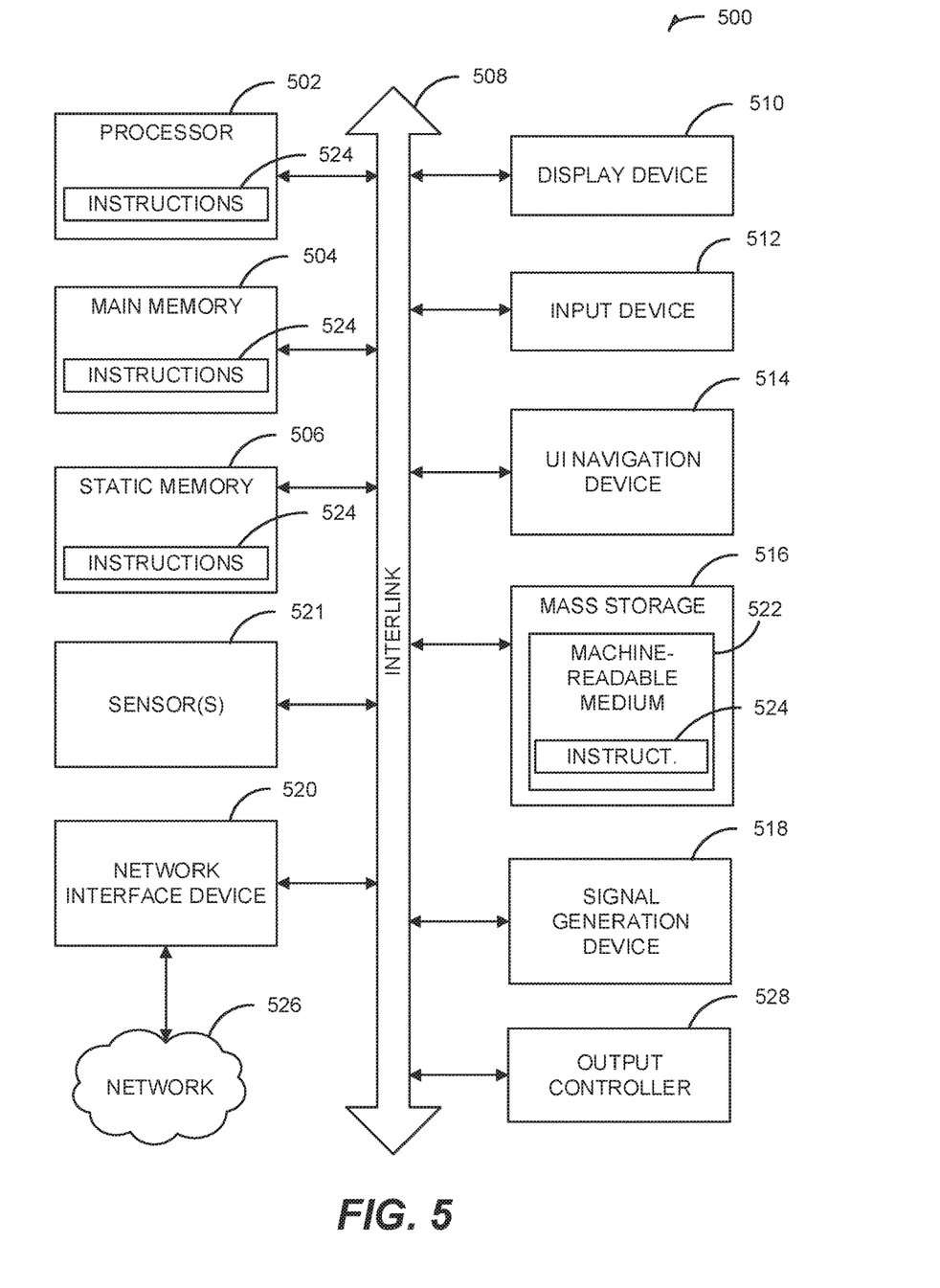
FIG. 5 shows a block diagram illustrating an example of a machine upon which one or more embodiments may be implemented

FIG. 5 illustrates a block diagram of an example machine 500 upon which any one or more of the techniques (e.g,, methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant particles having mass, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation, Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502. (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse, track ball, etc.). In an example, the display unit 510, input device 512, and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 ray include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502. during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (LIP), HTTP, etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and P2P networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

In an embodiment, a user or entity accesses the provided application from an instance of machine 500, via a network 526 to another instance of machine 500. It will be understood that the machine used by the entity may be different in architecture than the provider's machine(s), which are typically servers having routing capability, and within one or more data centers.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language that essentially provides a model of how designed hardware is expected to perform, Program code may be assembly or machine language, or data that may be compiled and/or interpreted. Furthermore, it is common in the art to speak of software, in one form or another, as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium, that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), and the like, as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical, or other forms of propagated signals or carrier wave encoding the program code may pass, such as antennas, optical fibers, communications interfaces, and the like. Program code may be transmitted in the form of packets, serial data, parallel data, propagated signals, and so forth, and may be used in a compressed or encrypted format.

Program code may be implemented in programs executing on programmable machines such as mobile or stationary computers, PDAs, smart phones, mobile Internet devices, set top boxes, cellular telephones and pagers, consumer electronics devices (including DVD players, personal video recorders, personal video players, satellite receivers, stereo receivers, cable television (TV) receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked micro-services, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a GPU, a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic, or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a. combination, as described more fully in conjunction with the flow diagrams in the figures. As such, modules may be hardware modules, and as such, modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A method comprising:
analyzing garbage collection logs for a virtual machine (VM), yielding an analysis, the garbage collection logs describing garbage collection activity for the VM having been performed according to an initial set of garbage collection parameters, the garbage collection parameters comprising an initial maximum tenuring age, an initial maximum new size, an initial survivor ratio, and an initial total heap size;
determining, based on the analysis, an updated maximum tenuring age, an updated maximum new size and an updated survivor ratio, yielding updated garbage collection parameters;
while garbage collection for the VM is performing according to the updated garbage collection parameters, monitoring garbage performance activity for the VM, yielding monitored performance data;
determining, based on the monitored performance data, a promotion rate of data from a new generation portion of a memory heap associated with the VM to an old generation portion of the memory heap;
determining, based on the promotion rate and a target major garbage collection rate, an updated total memory heap size, yielding a finalized set of garbage collection parameters; and
causing garbage collection for the VM to be performed according to the finalized set of garbage collection parameters.

2. The method of claim 1, wherein determining the updated maximum tenuring age comprises:
determining, based on data describing a set of data objects created by the VM, a number of data objects from the set of data objects that were alive at a first tenuring age and a number of data objects from the set of data objects that were alive at a second tenuring age that is subsequent to the first tenuring age;
determining a delta between the number of data objects from the set of data objects that were alive at the first tenuring age and the number of data objects from the set of data objects that were alive at the second tenuring age;
comparing the delta to a threshold value; and
in response to determining that the delta is less than the threshold value, assigning the second tenuring age as the updated maximum tenuring age.

3. The method of claim 2, wherein the first tenuring age indicates a number of times the set of data objects have been copied to survivor spaces in the new generation portion of the memory heap as the result of a minor garbage collection.

4. The method of claim 1, wherein the maximum tenuring age indicates a threshold number of times that a data object can be copied to survivor spaces in the new generation portion of the memory heap prior to being moved to the old generation portion of the memory heap.

5. The method of claim 1, wherein determining the updated maximum new size comprises:
determining an allocation rate of data to the memory heap;
dividing the allocation rate by a target minor garbage collection rate, yielding the updated maximum new size, the target minor generation garbage collection rate indicating a target frequency at which garbage collection is performed on a new generation portion of the memory heap.

6. The method of claim 1, wherein determining the updated survivor ratio comprises:

determining a subset of the new generation portion of the memory heap to designate as eden; and determining, from a remaining subset of the new generation portion of the memory heap that is not designated as eden, two or more survivor spaces.

7. The method of claim 1, wherein the updated total memory heap size is greater than the initial total memory heap size, the method further comprising:

allocating additional memory to the memory heap based on the updated total data heap size, wherein allocating the additional memory causes a memory size increase to the old generation portion of the memory heap.

8. An auto-tuning system comprising:

one or more computer processors; and one or more computer-readable mediums storing instructions that, when executed by the one or more computer processors, cause the auto-tuning system to perform operations comprising:

analyzing garbage collection logs for a virtual machine (VM), yielding an analysis, the garbage collection logs describing garbage collection activity for the VM having been performed according to an initial set of garbage collection parameters, the garbage collection parameters comprising an initial maximum tenuring age, an initial maximum new size, an initial survivor ratio, and an initial total heap size;

determining, based on the analysis, an updated maximum tenuring age, an updated maximum new size and an updated survivor ratio, yielding updated garbage collection parameters;

while garbage collection for the VM is performing according to the updated garbage collection parameters, monitoring garbage performance activity for the VM, yielding monitored performance data;

determining, based on the monitored performance data, a promotion rate of data from a new generation portion of a memory heap associated with the VM to an old generation portion of the memory heap;

determining, based on the promotion rate and a target major garbage collection rate, an updated total memory heap size, yielding a finalized set of garbage collection parameters; and causing garbage collection for the VM to be performed according to the finalized set of garbage collection parameters.

9. The auto-tuning system of claim 8, wherein determining the updated maximum tenuring age comprises:

determining, based on data describing a set of data objects created by the VM, a number of data objects from the set of data objects that were alive at a first tenuring age and a number of data objects from the set of data objects that were alive at a second tenuring age that is subsequent to the first tenuring age;

determining a delta between the number of data objects from the set of data objects that were alive at the first tenuring age and the number of data objects from the set of data objects that were alive at the second tenuring age;

comparing the delta to a threshold value; and in response to determining that the delta is less than the threshold value, assigning the second tenuring age as the updated maximum tenuring age.

10. The auto-tuning system of claim 9, wherein the first tenuring age indicates a number of times the set of data objects have been copied to survivor spaces in the new generation portion of the memory heap as the result of a minor garbage collection.

11. The auto-tuning system of claim 8, wherein the maximum tenuring age indicates a threshold number of times that a data object can be copied to survivor spaces in the new generation portion of the memory heap prior to being moved to the old generation portion of the memory heap.

12. The auto-tuning system of claim 8, wherein determining the updated maximum new size comprises:

determining an allocation rate of data to the memory heap;

dividing the allocation rate by a target minor garbage collection rate, yielding the updated maximum new size, the target minor generation garbage collection rate indicating a target frequency at which garbage collection is performed on a new generation portion of the memory heap.

13. The auto-tuning system of claim 8, wherein determining the updated survivor ratio comprises:

determining a subset of the new generation portion of the memory heap to designate as eden; and determining, from a remaining subset of the new generation portion of the memory heap that is not designated as eden, two or more survivor spaces.

14. The auto-tuning system of claim 8, wherein the updated total memory heap size is greater than the initial total memory heap size, the method further comprising:

allocating additional memory to the memory heap based on the updated total data heap size, wherein allocating the additional memory causes a memory size increase to the old generation portion of the memory heap.

15. A non-transitory computer-readable medium storing instructions that, when executed by one or more computer processors of an auto-tuning system, cause the auto-tuning system to perform operations comprising:

analyzing garbage collection logs for a virtual machine (VM), yielding an analysis, the garbage collection logs describing garbage collection activity for the VM having been performed according to an initial set of garbage collection parameters, the garbage collection parameters comprising an initial maximum tenuring age, an initial maximum new size, an initial survivor ratio, and an initial total heap size;

determining, based on the analysis, an updated maximum tenuring age, an updated maximum new size and an updated survivor ratio, yielding updated garbage collection parameters;

while garbage collection for the VM is performing according to the updated garbage collection parameters, monitoring garbage performance activity for the VM, yielding monitored performance data;

determining, based on the monitored performance data, a promotion rate of data from a new generation portion of a memory heap associated with the VM to an old generation portion of the memory heap;

determining, based on the promotion rate and a target major garbage collection rate, an updated total memory heap size, yielding a finalized set of garbage collection parameters; and causing garbage collection for the VM to be performed according to the finalized set of garbage collection parameters.

16. The non-transitory computer-readable medium of claim 15, wherein determining the updated maximum tenuring age comprises:

determining, based on data describing a set of data objects created by the VM, a number of data objects from the set of data objects that were alive at a first tenuring age and a number of data objects from the set of data objects that were alive at a second tenuring age that is subsequent to the first tenuring age;

determining a delta between the number of data objects from the set of data objects that were alive at the first tenuring, age and the number of data objects from the set of data objects that were alive at the second tenuring age;

comparing the delta to a threshold value; and in response to determining that the delta is less than the threshold value, assigning the second tenuring age as the updated maximum tenuring age.

17. The non-transitory computer-readable medium of claim 16, wherein the first tenuring age indicates a number of times the set of data objects have been copied to survivor spaces in the new generation portion of the memory heap as the result of a minor garbage collection.

18. The non-transitory computer-readable medium of claim 15, wherein the maximum tenuring age indicates a threshold number of times that a data object can be copied to survivor spaces in the new generation portion of the memory heap prior to being moved to the old generation portion of the memory heap.

19. The non-transitory computer-readable medium of claim 15, wherein determining the updated maximum new size comprises:

determining an allocation rate of data to the memory heap;

dividing the allocation rate by a target minor garbage collection rate, yielding the updated maximum new size, the target minor generation garbage collection rate indicating a target frequency at which garbage collection is performed on a new generation portion of the memory heap.

20. The non-transitory computer-readable medium of claim 15, wherein determining the updated survivor ratio comprises:

determining a subset of the new generation portion of the memory heap to designate as eden; and determining, from a remaining subset of the new generation portion of the memory heap that is not designated as eden, two or more survivor spaces.

* * * * *

UNITED STATES PATENT AND TRADEMARK OFFICE
CERTIFICATE OF CORRECTION

PATENT NO. : 10,223,258 B2  
APPLICATION NO. : 15/464634  
DATED : March 5, 2019  
INVENTOR(S) : Benjamin David Purgason Page 1 of 1

It is certified that error appears in the above-identified patent and that said Letters Patent is hereby corrected as shown below:

On the Title Page

Item (57), in "Abstract", in Column 2, Line 2, delete "automated." and insert --automated-- therefor In the Claims In Column 17, Line 6, in Claim 16, delete "tenuring," and insert --tenuring-- therefor Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*